United States Patent [19]

Tanaka

[11] Patent Number: 4,797,944

[45] Date of Patent: Jan. 10, 1989

[54] IMAGE SIGNAL ENCODING METHOD BY ORTHOGONAL TRANSFORMATION

[75] Inventor: Nobuyuki Tanaka, Kanagawa, Japan

[73] Assignee: Fuji Photo Film Co., Ltd., Kanagawa, Japan

[21] Appl. No.: 7,143

[22] Filed: Jan. 27, 1987

[30] Foreign Application Priority Data

Jan. 27, 1986 [JP] Japan ................................. 61-15265
Mar. 17, 1986 [JP] Japan ................................. 61-58803

[51] Int. Cl.⁴ .............................................. G06K 9/44
[52] U.S. Cl. ........................................ 382/56; 358/136
[58] Field of Search .................. 302/56; 358/135, 136, 358/260, 261, 262

[56] References Cited

U.S. PATENT DOCUMENTS

| | | | |
|---|---|---|---|
| 3,984,626 | 10/1976 | Mounts et al. | 358/135 |
| 3,984,626 | 10/1976 | Mounts et al. | 178/6 |
| 4,001,563 | 1/1977 | Bied-Charreton et al. | 360/40 |
| 4,001,564 | 1/1977 | Bied-Charreton et al. | 360/40 |
| 4,225,885 | 9/1980 | Lux et al. | 382/56 |
| 4,434,499 | 2/1984 | Motsch et al. | 375/122 |
| 4,591,909 | 5/1986 | Kuroda et al. | 358/136 |
| 4,633,330 | 12/1986 | Yamamitsu et al. | 360/32 |
| 4,656,500 | 4/1987 | Mori | 358/135 |
| 4,684,923 | 8/1987 | Koga | 358/261 |

Primary Examiner—Leo H. Boudreau
Assistant Examiner—Donald J. Daley
Attorney, Agent, or Firm—Sughrue, Mion, Zinn, Macpeak, and Seas

[57] ABSTRACT

An image signal encoding method by orthogonal transformation comprises the steps of conducting orthogonal transformation on each block of two-dimensional image signals based on a predetermined orthogonal function, and encoding the signals, which are obtained by transformation and arrayed in the order of sequency of the orthogonal function in the block, with an intrinsic code length. Code length allocation suitable for a block adjacent to the block, which has already been subjected to encoding, is predicted based on encoded signals and code length allocation in the block already subjected to encoding, and the transformed signals in the adjacent block are encoded in accordance with the predicted code length allocation. Or, transformed signals on the same sequency are extracted from the blocks, a standard deviation of the transformed signals thus extracted or a mean value of absolute values thereof is calculated for each of different sequency, and the code length for the transformed signal of each sequency is adjusted based on the standard deviation or the mean value.

7 Claims, 4 Drawing Sheets

IMAGE SIGNAL ENCODING METHOD BY ORTHOGONAL TRANSFORMATION

BACKGROUND OF THE INVENTION

1. Field of the Invention

This invention relates to a method of encoding image signals for the purpose of signal compression. This invention particularly relates to a method of encoding image signals by orthogonal transformation.

2. Description of the Prior Art

Image signals representing half tone images, such as television signals, are composed of enormous amounts of information, and a broad-band transmission line is required for transmission of the image signals. Such image signals involve much redundancy, and various attempts have been made to compress the image signals by restricting the redundancy. Also, in recent years, recording of half tone images on optical disks, magnetic disks, or the like has been generally put into practice. In this case, image signal compression is conducted generally for the purpose of efficiently recording image signals on a recording medium.

As one of the methods of image signal compression, a method utilizing orthogonal transformation of image signals is well known. In this method, digital two-dimensional image signals are divided into blocks comprising an appropriate number of samples, and orthogonal transformation of a value string comprising the sample values is conducted for each block. Since energy is concentrated at a specific component by the orthogonal transformation, a component of high energy level is encoded (quantized) by allocating a long code length thereto, and a component of low energy level is encoded coarsely with a short code length, thereby reducing the number of codes per block. As the orthogonal transformation, Fourier transformation, cosine transformation, Hadamard transformation, Karhunen-Loève transformation, or Harr transformation is usually used. The aforesaid image signal compression method will hereinbelow be described in further detail by taking the Hadamard transformation as an example. As shown in FIG. 2, blocks are formed by dividing digital two-dimensional image signals in a unit of, for example, two signals in a predetermined one-dimensional direction. When sample values $x(0)$ and $x(1)$ in the block are plotted on an orthogonal coordinate system, since correlation therebetween is high as mentioned above, most of the sample values are distributed near the straight line represented by the formula $x(1)=x(0)$ as shown in FIG. 3. Therefore, as shown in FIG. 3, the orthogonal coordinate system is transformed by an angle of 45° to determine a new $y(0)-y(1)$ coordinate system. On the $y(0)-y(1)$ coordinate system, $y(0)$ represents the low frequency component of the original image signals prior to transformation, and attains a value slightly larger than $x(0)$ and $x(1)$ [a value approximately $\sqrt{2}$ times the values of $x(0)$ and $x(1)$]. On the other hand, values of $y(1)$ representing the high frequency component of the original image signals are distributed just within a very narrow range near the $y(0)$ axis. In the case where a code length of, for example, seven bits is required for encoding of $x(0)$ and $x(1)$, seven bits or eight bits are required for encoding of $y(0)$. On the other hand, $y(1)$ can be encoded with a code length of, for example, four bits. Consequently, the code length per block is shortened, and compression of the image signals is achieved.

Orthogonal transformation of second order wherein each block is constituted by two image signals is conducted as mentioned above. As the order is increased, the tendency of energy concentrating at a specific component is increased, and it becomes possible to improve the effect of decreasing the number of bits. In general, the aforesaid transformation can be conducted by use of an orthogonal function matrix. In an extreme case, when an intrinsic function of the objective image is selected as the orthogonal function matrix, the transformed image signals are constituted by the intrinsic value matrix, and the original image can be expressed just by the diagonal component of the matrix. Also, instead of dividing the image signals just in a single direction to form blocks as mentioned above, each block may be constituted by two-dimensional image signals. In this case, the effect of decreasing the number of bits is markedly improved over the one-dimensional orthogonal transformation.

The transformed signals obtained by the aforesaid two-dimensional orthogonal transformation are arranged in the order of the sequency (i.e. the number of "0" position crossing) of the orthogonal function utilized for the transformation in each block. Since the sequency is correlated with the spatial frequency, the transformed signals are put side by side in the longitudinal and transverse directions in the order of the frequency as shown in FIG. 4. Therefore, the code length per block may be shortened by allocating a comparatively long code length to the transformed signals representing the low frequency component (i.e. the signals on the left upper side in FIG. 4) as in the case where a longer code length is allocated to $y(0)$ in the aforesaid one-dimensional orthogonal transformation of second order, and allocating a comparatively short code length or no code to the transformed signals representing the high frequency component (i.e. the signals on the right lower side in FIG. 4).

The aforesaid allocation of the code lengths is conducted in accordance with a predetermined pattern. However, since the code length necessary for representing the transformed signals of a sequency differs with images and blocks, it may occur that the predetermined and allocated code length is insufficient to represent the transformed signal accurately. In such a case, the maximum value or the minimum value which can be represented with the allocated code length is taken as the encoded signal. As a result, the image quality of a reproduced image obtained by decoding and inverse transformation is deteriorated. In order to eliminate this problem, the allocated code length determined in advance may be adjusted to a substantially long value. However, with this method, it is impossible to compress the image signals substantially.

SUMMARY OF THE INVENTION

The primary object of the present invention is to provide a method of image signal encoding by orthogonal transformation wherein the signal compression ratio is increased substantially.

Another object of the present invention is to provide a method of image signal encoding by orthogonal transformation, which is free from deterioration in image quality of a reproduced image caused by insufficiency of code length.

The present invention provides a method of image signal encoding by orthogonal transformation wherein orthogonal transformation is conducted on each block or two-dimensional image signals on the basis of a predetermined orthogonal function, and transformed signals obtained by the orthogonal transformation and put side by side in the order of sequency of said orthogonal function in the block are respectively encoded with an intrinsic code length, wherein the improvement comprises the steps of:

(i) predicting code length allocation suitable for a block adjacent to said block, which has already been subjected to said encoding, on the basis of encoded signals and code length allocation in said block already subjected to said encoding, and (ii) encoding respective transformed signals in said adjacent block in accordance with said predicted code length allocation.

The present invention also provides a method of image signal encoding by orthogonal transformation wherein orthogonal transformation is conducted on each block of two-dimensional image signals on the basis of a predetermined orthogonal function, and transformed signals obtained by the orthogonal transformation and put side by side in the order of sequency of said orthogonal function in the block are respectively encoded with an intrinsic code length, wherein the improvement comprises the steps of:

(i) extracting said transformed signals on the same sequency from the respective blocks, and calculating a standard deviation of said transformed signals thus extracted, or a mean value of absolute values of said transformed signals thus extracted, for each of different sequency, and (ii) adjusting said code length for said transformed signal of each sequency on the basis of said standard deviation or said mean value.

With the method of image signal encoding by orthogonal transformation in accordance with the present invention, it is possible to adjust the code length for the transformed signals to an optimal value which is not too long or short for encoding. Therefore, it becomes possible to prevent the image quality of a reproduced image obtained by decoding and inverse transformation from deteriorating due to insufficiency of the code length, and at the same time to markedly increase the signal compression ratio by minimizing the amount of the encoded signals.

DESCRIPTION OF THE PREFERRED EMBODIMENTS

The present invention will hereinbelow be described in further detail with reference to the accompanying drawings.

Figure 1:
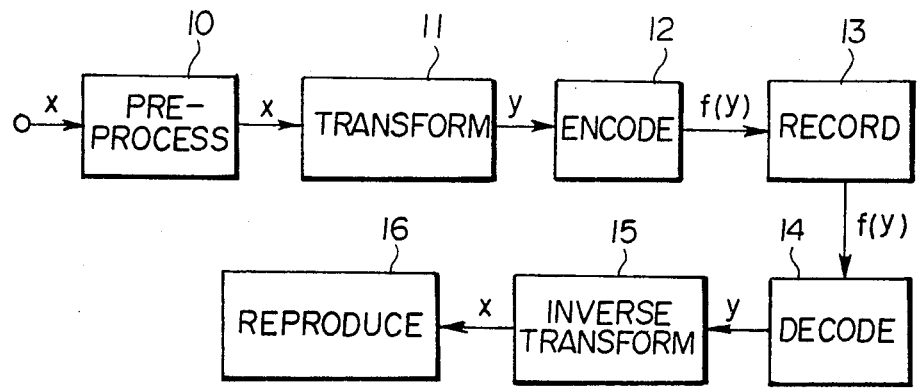
FIG. 1 is a block diagram showing the configuration of an apparatus for carrying out an embodiment of the method of image signal encoding by orthogonal transformation in accordance with the present invention.
Figure 2:
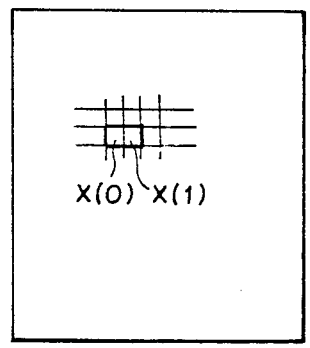
FIGS. 2 and 3 are explanatory views showing the orthogonal transformation in accordance with the present invention.
Figure 3:
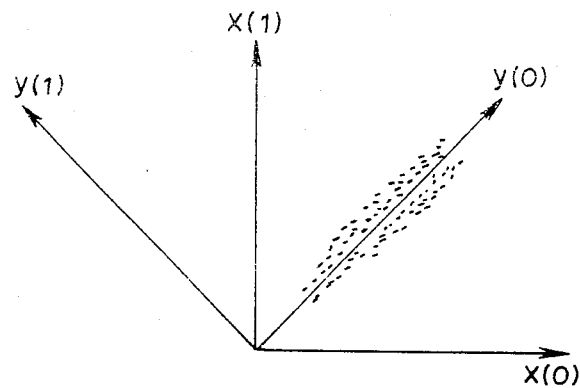
Figure 5:
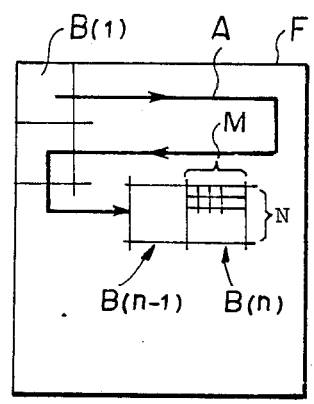

Referring to FIG. 1, which schematically shows an apparatus for carrying out an embodiment of the method of image signal encoding by orthogonal transformation in accordance with the present invention, image signals (original image signals) x representing a half tone image are first sent to a pre-processing circuit 10 and subjected therein to pre-processing for improvement of the data compression efficiency, for example, smoothing for noise removal. The pre-processed image signals x are sent to an orthogonal transformation circuit 11 and subjected therein to two-dimensional orthogonal transformation. For example, as shown in FIG. 5, the two-dimensional orthogonal transformation is conducted in a unit of a rectangular block B comprising MxN number of samples (picture elements) in a half tone image F represented by the image signals x. As the orthogonal transformation, the Hadamard transformation may be used. Since the transformation matrix in the Hadamard transformation is constituted just by $+1$ and $-1$, the Hadamard transformation can be executed by use of a transformation circuit simpler than in the other orthogonal transformations. Also, as well known, two-dimensional orthogonal transformation can be reduced to one-dimensional orthogonal transformation. Specifically, the two-dimensional orthogonal transformation is carried out by subjecting the image signals at the MxN number of picture elements in the two-dimensional block B to one-dimensional orthogonal transformation in the longitudinal direction, and then subjecting the MxN number of transformed signals thus obtained to one-dimensional orthogonal transformation in the transverse direction. The transformation in the longitudinal direction and the transformation in the transverse direction may be conducted in the reverse order.

Figure 4:
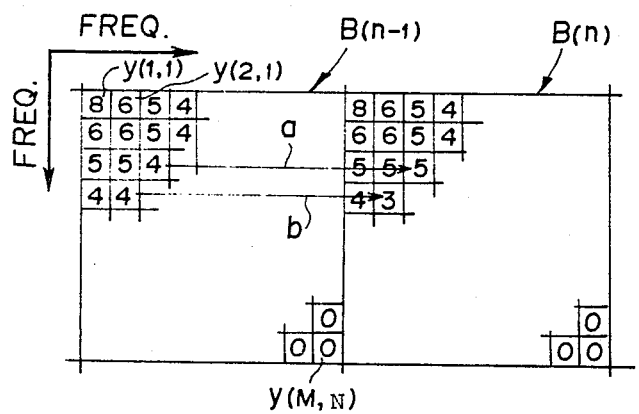
FIGS. 4 and 5 are explanatory views showing an embodiment of the method of image signal encoding by orthogonal transformation in accordance with the present invention.

As shown in FIG. 4, transformed signals obtained by the two-dimensional orthogonal transformation are put side by side in each block in the longitudinal and transverse directions in the order of the sequency of the function on which the orthogonal transformation is based (for example, the Walsh function in the case of the Hadamard transformation, or the trigonometrical function in the case of the Fourier transformation). Since the sequency corresponds to the spatial frequency, the transformed signals y are arranged in the order of the spatial frequency, i.e. in the order of the density of the detail components of the image, in the longitudinal and transverse directions in the block B. In FIG. 4, a transformed signal y(1,1) at the left end column on the top line corresponds to sequency 0 (zero). As well known, the transformed signal y(1,1) represents the average image density in the block B.

Figure 6:
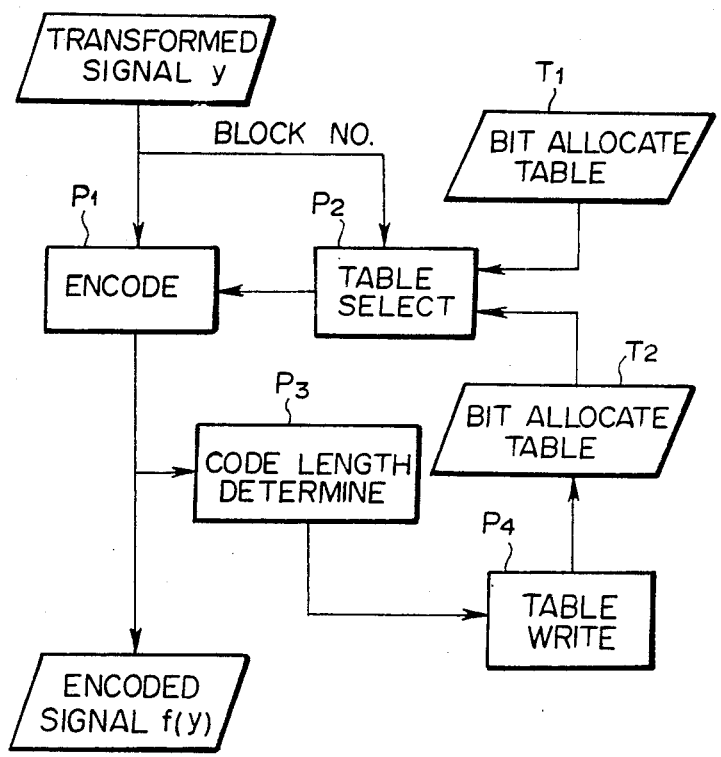
FIG. 6 is a flow chart showing the flow of encoding processing of signals obtained by orthogonal transformation in the apparatus shown in FIG. 1.

The transformed signals y thus arranged are sent to an encoding circuit 12 and encoded thereby. Encoding of the transformed signals y conducted by the encoding circuit 12 will hereinbelow be described with reference to FIG. 6. The encoding is conducted sequentially in the order of the array of the blocks B(1), ..., B(n−1), B(n) as indicated by the arrow A in FIG. 5. The encoding circuit 12 stores a predetermined bit allocation table T1 in, for example, a ROM, and encodes each of the transformed signals y in the block B(1), which is first subjected to the encoding, with a code length (i.e. a number of bits) in accordance with the allocation table T1 [step P1]. In the bit allocation table T1, an intrinsic number of bits is allocated for each sequency as shown, for example, in FIG. 4. Since energy is concentrated at the low frequency component in the transformed signals y as mentioned above, it is possible to decrease the number of bits required per block B and to achieve image signal compression by allocating a comparatively long code length to the low frequency component with high energy, and allocating a comparatively short code length to the high frequency component with low energy. Though another bit allocation table T2 is created as described later, the bit allocation table T1 stored in the ROM is selected in a step P2 and utilized for the encoding when the transformed signals y in the first block B(1) are encoded.

Signals f(y) thus encoded are output by the encoding circuit 12 as the encoded signals at the block B(1). Also, the encoded signals f(y) are sent to a step P3 and utilized for determining the shortest code sufficient in a strict sense for encoding the respective transformed signals y. For example, allocation of four bits to the transformed signal y of a sequency is determined in the allocation table T1. Also as shown in the table below, transformed signals y of 16 values within the range of from the minimum value of −8 to the maximum value of +7 are encoded with four-bit binary numerals.

| Transformed signal | Encoded signal | Transformed signal | Encoded signal |
| --- | --- | --- | --- |
| −8 | 1000 | 0 | 0000 |
| −7 | 1001 | 1 | 0001 |
| −6 | 1010 | 2 | 0010 |
| −5 | 1011 | 3 | 0011 |
| −4 | 1100 | 4 | 0100 |
| −3 | 1101 | 5 | 0101 |
| −2 | 1110 | 6 | 0110 |
| −1 | 1111 | 7 | 0111 |

As mentioned above, it may occur that the transformed signal y of the sequency for which four bits are allocated in the block B(1) attains a value which is too large to express with the four-bit code length, or of a very small value. Specifically, in the aforesaid example, when the transformed signal y attains a value not larger than −9 or a value not smaller than 8, the transformed signal y cannot be accurately expressed with the four-bit code length, and is encoded into "1000" in the former case and into "0111" in the latter case. Therefore, for the sequency at which such an encoded signal appears, one bit for example is added to extend the code length to five bits and is written into the bit allocation table T2 in a RAM or the like [step P4]. In the case where the encoded signal becomes "1000", since it is not possible to discriminate whether the value of the transformed signal y before encoding was −8 or not larger than −9, the code length is always extended for safety. This also applies in the case where the encoded signal becomes "0111". On the other hand, in the case where the transformed signal y attains a value of 0 or 1, the signal y can be expressed with two bits. Also, when the transformed signal y attains a value of 2 or 3, it can be expressed even with three bits. Therefore, for the sequency at which such encoded signals appear, the code lengths are shortened by two bits and by one bit respectively into two bits and three bits, and are written into the bit allocation table T2 in the same manner as mentioned above.

When the transformed signals y of the block B(2) which is to be encoded second is encoded, the bit allocation table T2 created as mentioned above is selected for the encoding [step P2]. This condition is maintained until the encoding is finished for all of the blocks B(1), ..., B(n−1), B(n) ... Also, since the code length determination in the step P3 and the writing (rewriting) in the step P4 are sequentially conducted up to the final stage, the transformed signal y of a sequency k in the block B(n) subjected to the n'th encoding is encoded with a code length predicted from the encoded signal f(y) of the sequency k in the previous block B(n−1). Since the image signals at the block B(n) and the block B(n−1) adjacent to each other are correlated with each other to a high extent, the code length predicted as mentioned above is not too long and not too short for encoding of the respective transformed signals y in the block B(n). An example of the aforesaid change of the code length is shown in FIG. 4. In FIG. 4, the arrows a and b respectively indicate the sequency at which the code length is extended and the sequency at which the code length is shortened.

The image signals f(y) encoded in the aforesaid manner are recorded on a recording medium (image file) such as an optical disk, or a magnetic disk in a recording and reproducing apparatus 13. Since the image signals f(y) have been markedly compressed as compared with the original image signals x, a large number of images can be recorded on a recording medium such as an optical disk. When the image is to be reproduced, the image signals f(y) are read out from the recording medium, and decoded into the transformed signals y in a decoding circuit 14. The transformed signals y thus decoded are sent to an inverse transformation circuit 15 and transformed inversely to the aforesaid two-dimensional orthogonal transformation. The original image signals x are thus restored, and sent to an image reproducing apparatus 16 for use in reproduction of the image which the image signals x represent.

Figure 7:
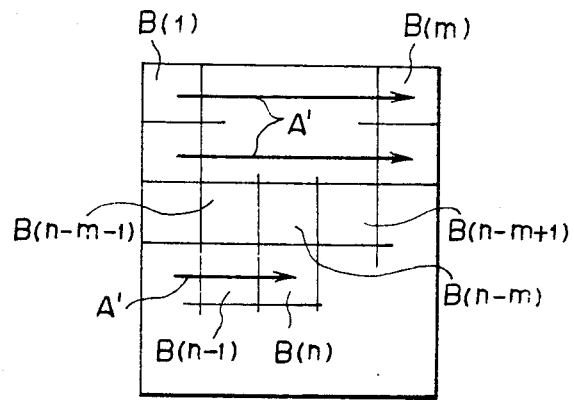
FIG. 7 is an explanatory view showing another embodiment of the method of image signal encoding by orthogonal transformation in accordance with the present invention, wherein encoding is conducted in a different order.

In the aforesaid embodiment, the code length suitable for each of the transformed signals y in the block B(n) is predicted on the basis of the encoded signal in the block B(n−1) which is subjected to the encoding just prior to the block B(n). However, it is also possible to predict the suitable code length based on the encoded signal in the other block. For example, as shown in FIG. 7, in the case where the encoding of the respective blocks B is conducted in the order as indicated by the arrows A', A', ..., the code length suitable for the block B(n) may be predicted based on the encoded signal in a block B(n−m), where m denotes the number of columns on each line in FIG. 7, which is on the line just above the block B(n) and at the same column as the block B(n), or based on the encoded signal in a block B(n−m−1) or the block B(n−m+1).

Figure 8:
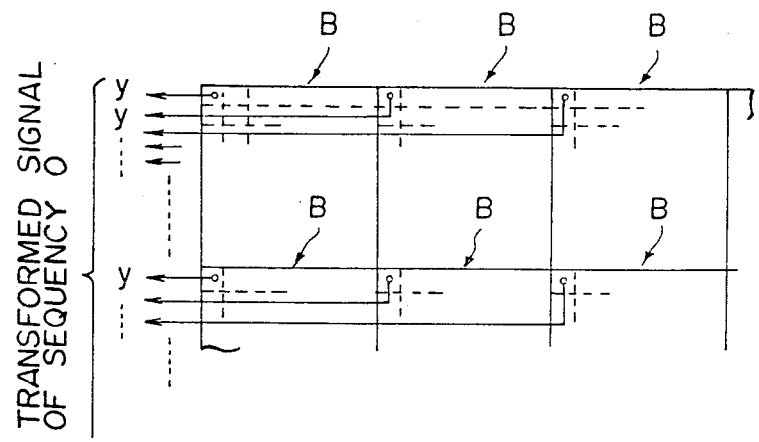
FIGS. 8 and 9 are explanatory views showing a further embodiment of the method of image signal encoding by orthogonal transformation in accordance with the present invention.
Figure 9:
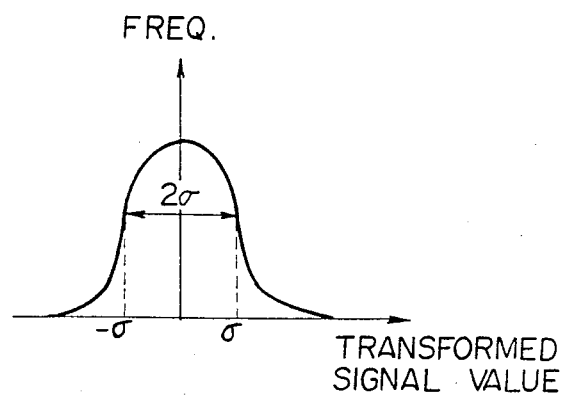

A further embodiment of the method of image signal encoding by orthogonal transformation in accordance with the present invention will hereinbelow be described mainly with reference to FIGS. 8 and 9.

This embodiment is carried out by the apparatus as shown in FIG. 1. In this embodiment, the encoding circuit 12 shown in FIG. 1 extracts the transformed signals y at the same sequency from all of the blocks B, B, ... (FIG. 7 shows extraction of the transformed signals y at the sequency 0, 0, ...) The signal extraction is conducted for all of the different sequency. The encoding circuit 12 then calculates a standard deviation $\rho$ of the transformed signals y thus extracted, calculates the code length (number of bits) on the basis of the standard deviation $\rho$, and selects said number of bits as the code length for the corresponding sequency. Specifically, the code length calculated on the basis of a standard deviation on of the transformed signals y at a sequency n extracted from the respective blocks B, B, . . . is adjusted as the code length for the sequency n. The value of $\rho n$ may be calculated for each image, or may be calculated from several predetermined standard images. The number Db of bits based on the standard deviation $\rho$ is calculated by the formula expressed, for example, as $$Db = [\log_2 (2\rho + 1)]$$

by half-adjust of the fraction below the decimal point. Since the transformed signals y of the same sequency attain values resembling each other in many cases, their distribution becomes approximately as shown in FIG. 9. (In the formula shown above, 1 is added to $2\rho$ in order to prevent the Db value from becoming a minus value when the value of $\rho$ is smaller than 0.5.) Accordingly, the code length which is not insufficient for the value two times the standard deviation $\rho n$ becomes sufficient for most of the transformed signals y of the sequency n. The aforesaid operations are conducted for all sequency to obtain the bit allocation table as shown on the left side of FIG. 4.

Of the transformed signals y of the sequency n, a signal y of a particularly large value or a particularly small value cannot be accurately encoded with the number Db of bits. This problem can be eliminated by extending the code length by a predetermined length for the transformed signal y which is clipped during the encoding.

In the case where such extension of the code length is not conducted, in order to prevent the problem that the transformed signals y in the low frequency region including important image information are clipped and encoded, it is possible for the code length for the transformed signal y of a sequency not larger than a predetermined value not to be determined by the aforesaid method, but to be adjusted to a predetermined code length incuding a substantial margin.

Though the code length for the transformed signals y of each sequency is adjusted on the basis of the standard deviation $\rho$ of the transformed signals y in the last mentioned embodiment, the same effects can be obtaine also by using a mean value of the absolute values of the transformed signals y in lieu of the standard deviation $\rho$.

Also, since the transformed signals y of the sequency corresponding to the low spatial frequency (i.e. the sequency on the left upper side of FIG. 4), particularly the transformed signal y(1,1) of the sequency 0 (zero), are very important for reproduction of the original image, clipping of said transformed signals y during the encoding should be avoided as much as possible. Accordingly, the aforesaid processing of adjusting the code length for the transformed signals y based on the standard deviation $\rho$ of the transformed signals y or based on the mean value of the absolute values of the transformed signals y may be carried out only for the sequency corresponding to the spatial frequencies not lower than a predetermined value. For the sequency corresponding to the low spatial frequencies less than said predetermined value, the code length for the transformed signals y may be adjusted to a length necessary for expressing the maximum value of the transformed signals y which may appear in each sequency. The maximum value of the transformed signals y which may appear in each sequency can be determined experimentally or be based on the dynamic range of the picture element values and the size of the block.

I claim:

1. A method of image signal encoding by orthogonal transformation wherein the orthogonal transformation is conducted on each block of two-dimensional image signals on the basis of a predetermined orthogonal function, and the transformed signals obtained by the orthogonal transformation are put side by side in the order of sequency of said orthogonal function in the block and are respectively encoded with an intrinsic code length, wherein the improvement comprises the steps of:
    (i) predicting code length allocation suitable for a block adjacent to said block, which has already been subjected to said encoding, on the basis of encoded signals and code length allocation in said block already subjected to said encoding, and
    (ii) encoding respective transformed signals in said adjacent block in accordance with said predicted code length allocation.

2. A method as defined in claim 1 wherein said transformed signals are encoded into binary codes.

3. A method of image signal encoding by orthogonal transformation wherein the orthogonal transformation is conducted on each block of two-dimensional image signals on the basis of a predetermined orthogonal function, and the transformed signals obtained by the orthogonal transformation are put side by side in the order of sequency of said orthogonal function in the block and are respectively encoded with an intrinsic code length, wherein the improvement comprises the steps of:
    (i) extracting said transformed signals; assembling said extracted signals having the same sequency in each of the respective blocks, into a separate group for each different sequency; and calculating a standard deviation of said transformed signal thus extracted, or a mean value of absolute values of said transformed signals thus extracted, for each said different sequency; and
    (ii) adjusting said code length for said transformed signal of each sequency on the basis of said standard deviation or said means value.

4. A method of image signal encoding by orthogonal transformation wherein the orthogonal transformation is conducted on each block of two-dimensional image signals on the basis of a predetermined orthogonal function, and the transformed signals obtained by the orthogonal transformation are put side by side in the order of sequency of said orthogonal function in the block and are respectively encoded with an intrinsic code length, wherein the improvemet comprises the steps of:
    (i) extracting said transformed signals assembling said extracted signals having the same sequency in each of the respective blocks, into a separate group for each different sequency, and calculating a standard deviation of said transformed signal thus extracted, or a mean value of absolute values of said transformed signals thus extracted, for each said different sequency, and
    (ii) adjusting said code length for said transformed signal of each sequency on the basis of said standard deviation or said mean value; and wherein processing for adjusting said code length on the basis of said standard deviation or said mean value is conducted for the sequency corresponding to a spatial frequency not lower than a predetermined value, and said code length for the sequency corresponding to a spatial frequency lower than said predetermined value is adjusted to a length necessary for expressing the maximum transformed signal value which may appear in each sequency.

5. A method as defined in claim 4 wherein said code length is adjusted to a value which is not insufficient for the value two times said standard deviation or the value two times said mean value.

6. A method as defined in claim 3 wherein said transformed signals are encoded into binary codes.

7. A method as defined in claim 3 wherein said code length is adjusted to a value which is not insufficient for the value two times said standard deviation or the value two times said mean value.

* * * * *